US008543596B1

(12) United States Patent
Kostamaa et al.

(10) Patent No.: US 8,543,596 B1
(45) Date of Patent: Sep. 24, 2013

(54) ASSIGNING BLOCKS OF A FILE OF A DISTRIBUTED FILE SYSTEM TO PROCESSING UNITS OF A PARALLEL DATABASE MANAGEMENT SYSTEM

(75) Inventors: O. Pekka Kostamaa, Santa Monica, CA (US); Keliang Zhao, La Jolla, CA (US); Yu Xu, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 874 days.

(21) Appl. No.: 12/640,320

(22) Filed: Dec. 17, 2009

(51) Int. Cl.
*G06F 17/30* (2006.01)
*G06F 12/00* (2006.01)

(52) U.S. Cl.
USPC ............ 707/770; 711/148; 711/202; 709/214

(58) Field of Classification Search
None
See application file for complete search history.

(56) References Cited

U.S. PATENT DOCUMENTS

| | | | |
|---|---|---|---|
| 5,890,156 A * | 3/1999 | Rekieta et al. | 707/610 |
| 6,959,306 B2 * | 10/2005 | Nwabueze | 1/1 |
| 6,983,463 B1 * | 1/2006 | Hunt | 719/316 |
| 7,698,272 B2 * | 4/2010 | Betten et al. | 707/748 |
| 2008/0177690 A1 * | 7/2008 | Vescovi et al. | 706/48 |
| 2009/0089560 A1 * | 4/2009 | Liu et al. | 712/226 |

OTHER PUBLICATIONS

Dhruba Borthakur, The Apache Software Foundation, Apache Hadoop Core Project, HDFS Architecture, 2008 (14 pages).
Ian Hudson, The Maximum Flow Problem, CS-272, May 1, 2004 (19 pages).
Andrew V. Goldberg et al., A New Approach to the Maximum-Flow Problem, Journal of the Association for Computing Machinery, vol. 35, No. 4, Oct. 1988, pp. 921-940.

* cited by examiner

*Primary Examiner* — Gary Portka
(74) *Attorney, Agent, or Firm* — Trop, Pruner & Hu, P. C.

(57) ABSTRACT

In general, a technique or mechanism is provided to efficiently transfer data of a distributed file system to a parallel database management system using an algorithm that avoids or reduces sending of blocks of files across computer nodes on which the parallel database management system is implemented.

21 Claims, 4 Drawing Sheets

ASSIGNING BLOCKS OF A FILE OF A DISTRIBUTED FILE SYSTEM TO PROCESSING UNITS OF A PARALLEL DATABASE MANAGEMENT SYSTEM

BACKGROUND

A database management system is used to store data in relational tables that are accessible by database management software. Clients are able to submit queries, such as Standard Query Language (SQL) queries, to the database management software to cause retrieval or update (insertion, deletion, or modification) of data in the tables. For enhanced performance, many database management systems are implemented as parallel database management systems implemented in a system having multiple computer nodes.

An enterprise (e.g., company, educational organization, government agency, etc.) may keep enterprise data in a parallel database management system. However, the enterprise may also employ a different file system, such as a distributed file system, to store other data. The presence of both a parallel database management system and distributed file system may result in inefficiencies in how data is accessed from the parallel database management system and distributed file system.

SUMMARY

In general, according to an embodiment, a technique or mechanism is provided to efficiently transfer data of a distributed file system to a parallel database management system using an algorithm that avoids or reduces sending of blocks of files across computer nodes on which the parallel database management system is implemented.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

Figure 1:
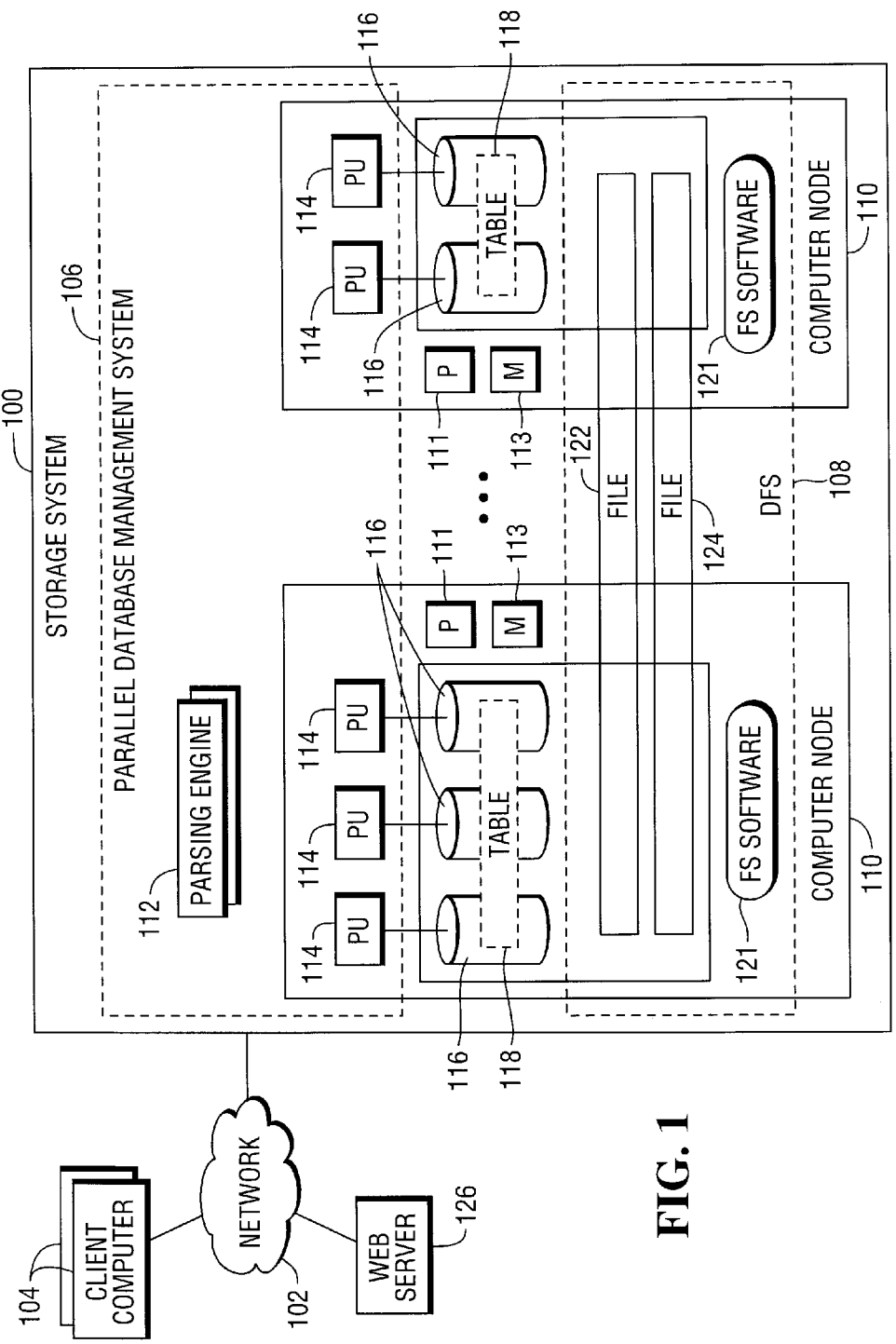
FIG. 1 is a block diagram of an example system that includes a storage system that has a distributed file system and a parallel database management system, in accordance with some embodiments.

In accordance with some embodiments, a mechanism or technique is provided to efficiently provide blocks of one or more files of a distributed file system to a parallel database management system. An enterprise (e.g., company, educational organization, government agency, etc.) may store certain enterprise data in the parallel database management system. However, other data may be maintained in a distributed file system.

A parallel (or distributed) database management system refers to a system that manages storage, access, and update of data in a database made up of one or more relational tables. A parallel database system can include multiple computer nodes interconnected by a network, and tables in the parallel database system can be partitioned across multiple computer nodes. A distributed file system (DFS) refers to a system for organizing and storing files across multiple computer nodes. Examples of a DFS include the Hadoop distributed file system (HDFS), the Google distributed file system, or other types of distributed file system. The HDFS is a distributed file system designed to manage storage of data across many computer nodes, which provides reliability by replicating data across multiple computer nodes. A version of HDFS is described in "HDFS Architecture," as published by the Apache Software Foundation, dated 2008. The Google distributed file system is developed by Google, Inc., and also manages storage of data across multiple computer nodes. Although examples of specific distributed file systems are referred to in this discussion, it is noted that in other embodiments, other types of distributed file systems can be employed in other embodiments.

In a specific example, if the enterprise is a company that maintains an e-commerce website, customer orders that are received through the e-commerce website (and associated information such as order processing information and delivery information) may be maintained in the parallel database management system. However, click data associated with user interaction with the e-commerce website may be stored in the DFS. Click data refers to data representing user clicks (user selections of links provided by web pages of the e-commerce website). In this example, the enterprise may later wish to analyze clicks made by a user prior to purchase of particular products or services, such as to better understand what information customers may have viewed (such as information relating to other products or services) prior to a purchase decision. To perform such analysis, the enterprise would submit queries, such as Standard Query Language (SQL) queries, to the parallel database management system to obtain customer order information. Moreover, the enterprise would have to access the click data maintained by the DFS.

One straightforward approach to loading a file of the DFS into the parallel database management system would be to use an application programming interface (API), or other type of interface, of the DFS to open the file and to read the data in the file for loading into the parallel database system using a load utility. However, this approach would involve the DFS having to obtain data stored in multiple computer nodes of a storage system (on which the parallel database management system is also implemented), and to load such data obtained from multiple computer nodes to the parallel database management system.

The parallel database management system has multiple processing units, and loading the data from the DFS to the processing units would mean that the data has to be distributed to the multiple processing units. This approach of providing data from the DFS to the parallel database management system can involve a relatively large amount of network communication, which can present a bottleneck. In addition, placing increased burden on the network between the computer nodes for the purpose of communicating data of a DFS to the distributed database management system means that less bandwidth would be available for performing other database system-related operations, which would reduce the overall efficiency and performance of the parallel database management system.

In accordance with some embodiments, an efficient mapping mechanism is provided to map blocks of a file (or multiple files) of the DFS to the processing units of the parallel database management system. A "processing unit" of the database system refers to an element of the database system that performs query processing tasks associated with the database system. The mapping allows blocks of the DFS file(s) to be assigned to computer nodes on which the parallel database management system is implemented in a way that avoids or reduces transferring blocks across computer nodes, thereby reducing or avoiding placing excessive burden on the network between computer nodes.

In general, both the DFS and the parallel database management system are provided in a storage system that has multiple computer nodes. In response to a request for a file of the DFS, a mapping of blocks of the DFS file to the computer nodes is determined using an algorithm that avoids or reduces sending of blocks of the file across the computer nodes. Next, the mapping is used to assign the blocks of the DFS file to corresponding processing units of the parallel database management system. The mapping of blocks of the file to the computer nodes can be determined by solving a maximum flow network problem that represents the flow network using a graph having graph nodes that represent the blocks of the DFS file and the computer nodes. Solving a maximum flow network problem is discussed in further detail below.

FIG. 1 illustrates an example arrangement that includes a storage system 100 coupled over a data network 102 to one or more client computers 104. The storage system 100 includes a database management system 106 and a DFS 108. The client computers 104 can submit queries, such as SQL queries, to the database management system 106 to access data maintained by the database management system 106.

The storage system 100 has multiple computer nodes 110 that are configured to implement the parallel database management system 106 and DFS 108.

The database management system 106 includes one or more parsing engines 112 (which may be implemented in one or more of the computer nodes 110), and processing units 114 provided in corresponding computer nodes 110. Each processing unit 114 is connected to a corresponding storage module 116, where each storage module is a logical storage module 116 managed by the corresponding processing unit 114. One or more relational tables 118 (and possibly other database structures such as views and indexes) are stored in the storage modules 116 that are distributed across the computer nodes 110.

Each parsing engine 112 has a parser and a scheduler. The parser receives database queries (such as those submitted by the client computers 104), parses each received query, and generates executable steps for the parsed query. The parser includes an optimizer that generates query plans in response to a query, selecting the most efficient from among the plural query plans. The scheduler sends the executable steps generated by the parser to multiple processing units 114 in the database management system 106.

In some implementations, each processing unit 114 can perform the following tasks: inserts, deletes, or modifies contents of tables; creates, modifies, or deletes definitions of tables; retrieves information from definitions and tables; and locks databases and tables. In one example, each processing unit 114 is based on an access module processor (AMP) used in some TERADATA® database systems from Teradata Corporation. Each processing unit 114 manages access of data in respective storage modules 116. The presence of multiple processing units 114 and corresponding storage modules 116 define a parallel database system.

The storage modules 116 are implemented in respective storage media in the computer nodes 110. The storage media can be implemented with disk-based storage devices, semiconductor storage devices, and so forth.

Files (e.g., 122 and 124 in FIG. 1) of the DFS 108 are also stored on the storage media of the computer nodes 110. Each file of the DFS 108 can include one or more files 122, 124, where each file includes various blocks. A "block" refers to some unit of storage, where a collection of blocks together make up a file of the DFS 108.

The files 122 and 124 of the DFS 108 may store data obtained from another network node, such as web server 126 connected to the network 102. The web server 126 can provide a website, for example, which users can access. The website provided by the web server 126 can be an e-commerce website, at which the users can purchase products or services. Clicks made in web pages presented by the web server 126 can be tracked, and stored in the files 122, 124 of the distributed file system 108. In such an example, the data stored in the files 122, 124 includes click data. In other examples, the DFS 108 can store other types of data.

The DFS 108 also includes file system software 121 that is configured to manage access and storage of the files (including files 122 and 124) in the DFS 108.

Each of the computer nodes 110 of FIG. 1 further includes one or more processors 111, which are connected to respective memories 113. Software components, such as the parsing engine(s) 112, processing units 114, and software 121 of the DFS 108, are executable on the processors 111.

Figure 2:
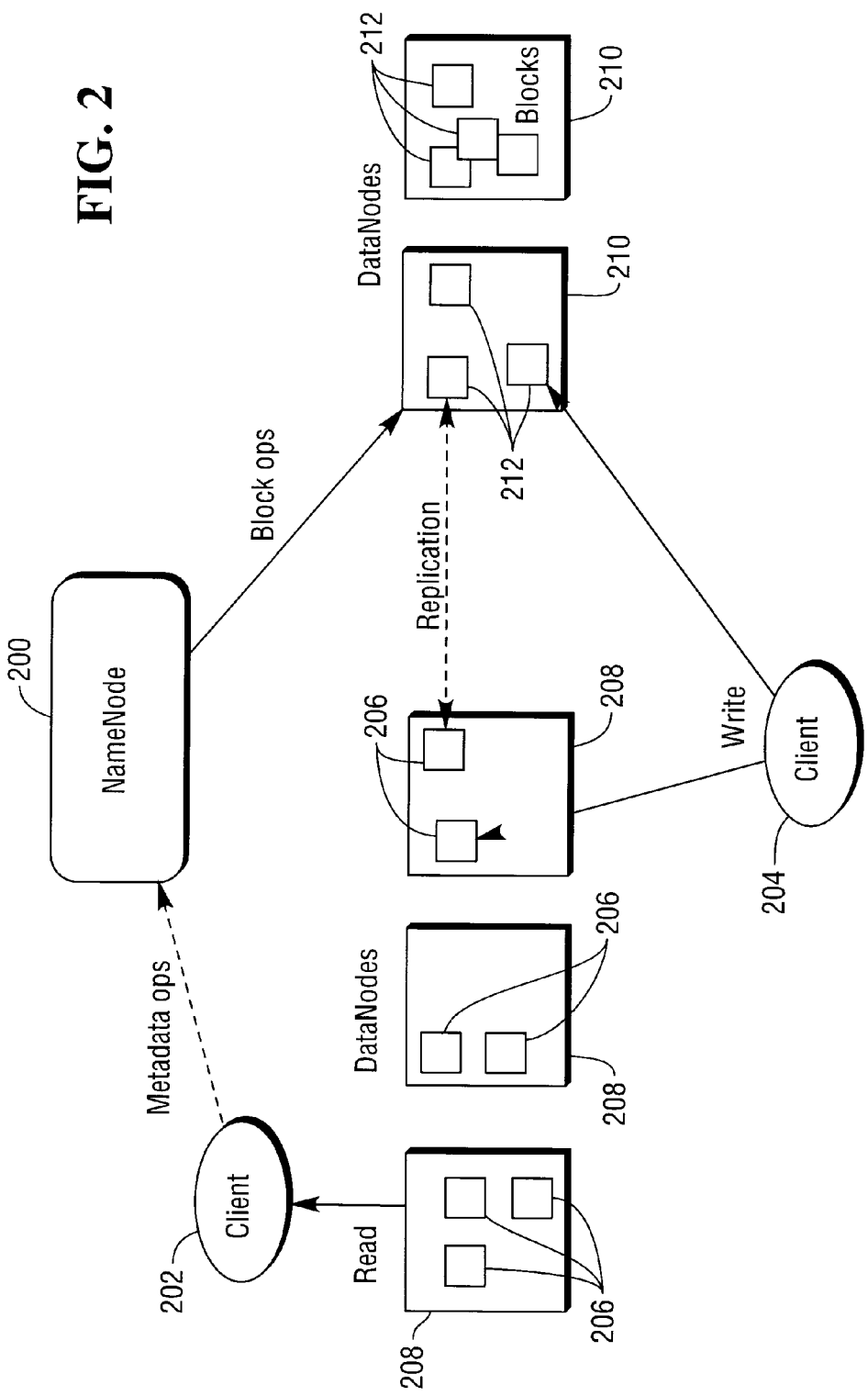
FIG. 2 is a block diagram of an example distributed file system usable in the storage system according to some embodiments.

FIG. 2 illustrates an example of a DFS architecture, such as the HDFS architecture. HDFS stores each file as a sequence of blocks, and all blocks in a file except the last block are the same size. The blocks of a file can be replicated for fault tolerance. The block size (size of each block) and the replication factor (number of times each block is to be copied) are configurable per file.

The HDFS architecture defines multiple HDFS clusters, where each HDFS cluster (such as that shown in FIG. 2) includes a single NameNode, which is a master server that manages the file system namespace and regulates access to files by clients (e.g., clients 202 and 204 in FIG. 2). In addition, there are a number of DataNodes. In one example, there is one DataNode per computer node 110 in the storage system 100 of FIG. 1. A DataNode manages the storage media attached to (or that is part of) the computer node that the DataNode runs on. Each DataNode maintains a storage of blocks 206 for a corresponding file. As shown in the example of FIG. 2, there are three DataNodes that store respective groups of blocks 206 for a particular file. FIG. 2 also shows additional DataNodes 210 that are used to store replicas 212 (replica blocks) of the blocks 206 in DataNodes 208.

HDFS exposes a file system name space and allows user data to be stored in files. In the example of FIG. 2, the client 202 reads blocks from the DataNodes 208, and the client 204 writes blocks into the DataNodes 208. In the context of the storage system 100 of FIG. 1, the clients 202, 204 can be the processing units 114 of the parallel database management system 106.

Although FIG. 2 shows a specific architecture of the DFS 108, note that in other embodiments other DFS architectures can be used.

Figure 3:
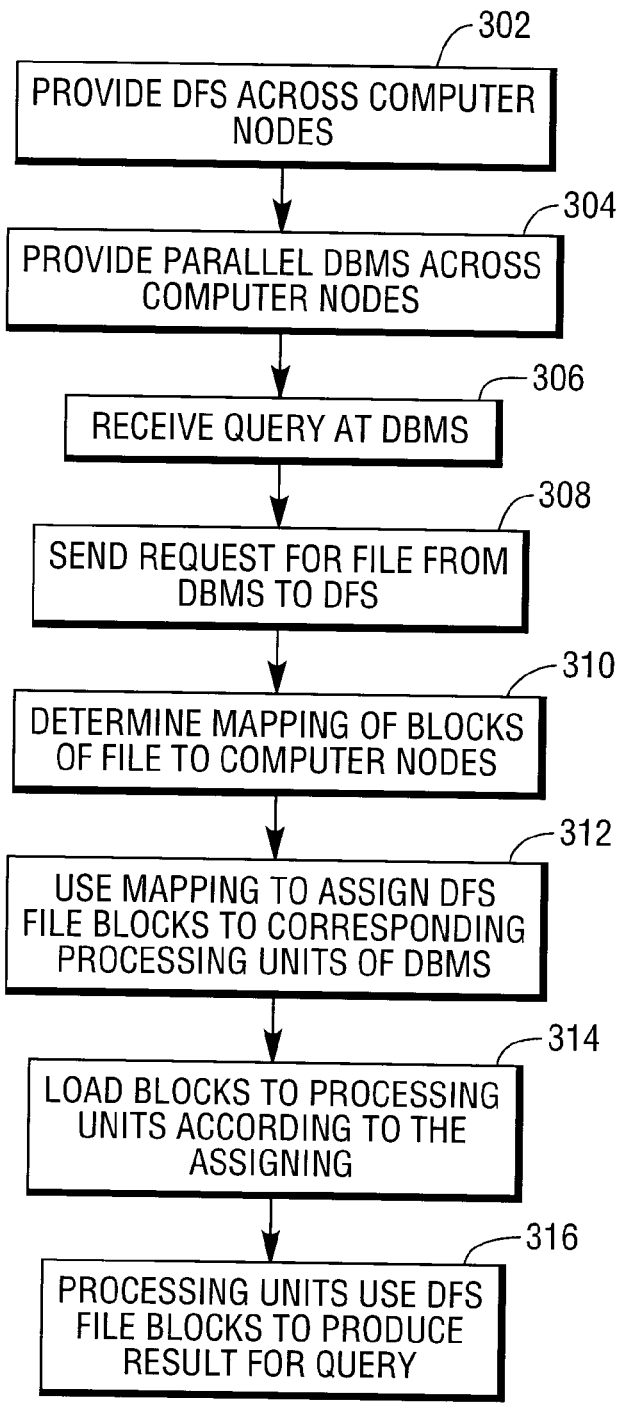
FIG. 3 is a flow diagram of a process of providing data from the distributed file system to the parallel database management system, according to an embodiment.

FIG. 3 is a flow diagram of a process according to an embodiment. The DFS 108 is provided (at 302) across the computer nodes 110, where the DFS 108 includes at least one file, such as file 122 and/or file 124. In addition, the parallel database management system 106 is also provided (at 304) across the computer nodes 110 of the storage system 100.

During operation, the database management system 106 may receive (at 306) an SQL query from a client computer, such as one of client computers 104 shown in FIG. 1. The query may cause the database management system 106 to access data of the DFS 108 to process the query. For example, in the e-commerce website example given above, the query may seek data relating to click data associated with orders placed at the e-commerce website, which means that the database management system 106 would have to access the DFS 108 to obtain results for the received query.

Assuming that the database management system 106 has to access the DFS 108 to process the query, the database management system 106 sends (at 308) to the DFS 108 a request for the desired data, such as from a file of the DFS 108. The foregoing provides an example of a pull technique of retrieving data from the DFS 108. In an alternative embodiment, the DFS 108 may push data to the parallel database management system 106, in which case the database management system 106 does not have to send a request to the DFS 108.

Next, the database management system 106 determines (at 310) a mapping of blocks of the DFS file to computer nodes 110 of the storage system 100. As discussed further below, this mapping can be determined by solving a maximum flow network problem, which attempts to find a maximum flow in a flow network that contains graph nodes representing DFS file blocks and system computer nodes.

The mapping is used (at 312) to assign blocks of the DFS file to corresponding processing units 114 of the parallel database management system. The assignment of blocks of the DFS file to corresponding processing units 114 of the parallel database management system 106 does not require that the processing units 114 have to interact with each other.

The blocks of the DFS file are then loaded (at 314) to the processing units 114 of the parallel database management system 106 according to the assignment. The loading of DFS file blocks to processing units includes locally loading DFS file blocks to respective processing units in each of the computer nodes, such that communication of blocks across a network inter-connecting the computer nodes is avoided for loading the blocks to the processing units. The processing units 114 can then use (at 316) the blocks retrieved from the DFS file to produce a result for the received query.

The following provides further details regarding mapping of blocks of a DFS file to computer nodes, such that the blocks can be assigned to processing units of the parallel database management system that avoids or reduces the likelihood of transferring data between computer nodes. To obtain information regarding the organization of the blocks maintained by the DFS 108, the database management system 106 can ask the NameNode 200 shown in FIG. 2 (assuming an HDFS implementation) for information. A file Z (e.g., 122 or 124 in FIG. 1) has the following blocks: $B_1, \ldots, B_i, \ldots, B_N$. For each block $B_i$ of file Z, a list $L_i$ of computer nodes (sorted by node identifier) that contains a copy of $B_i$ is obtained (note that there may be multiple replicas of $B_i$). For N blocks, there will be N $L_i$ lists. Assume that the file Z is replicated F times, then the size of $L_i$ is F. Note that F is a configurable parameter.

Figure 4:
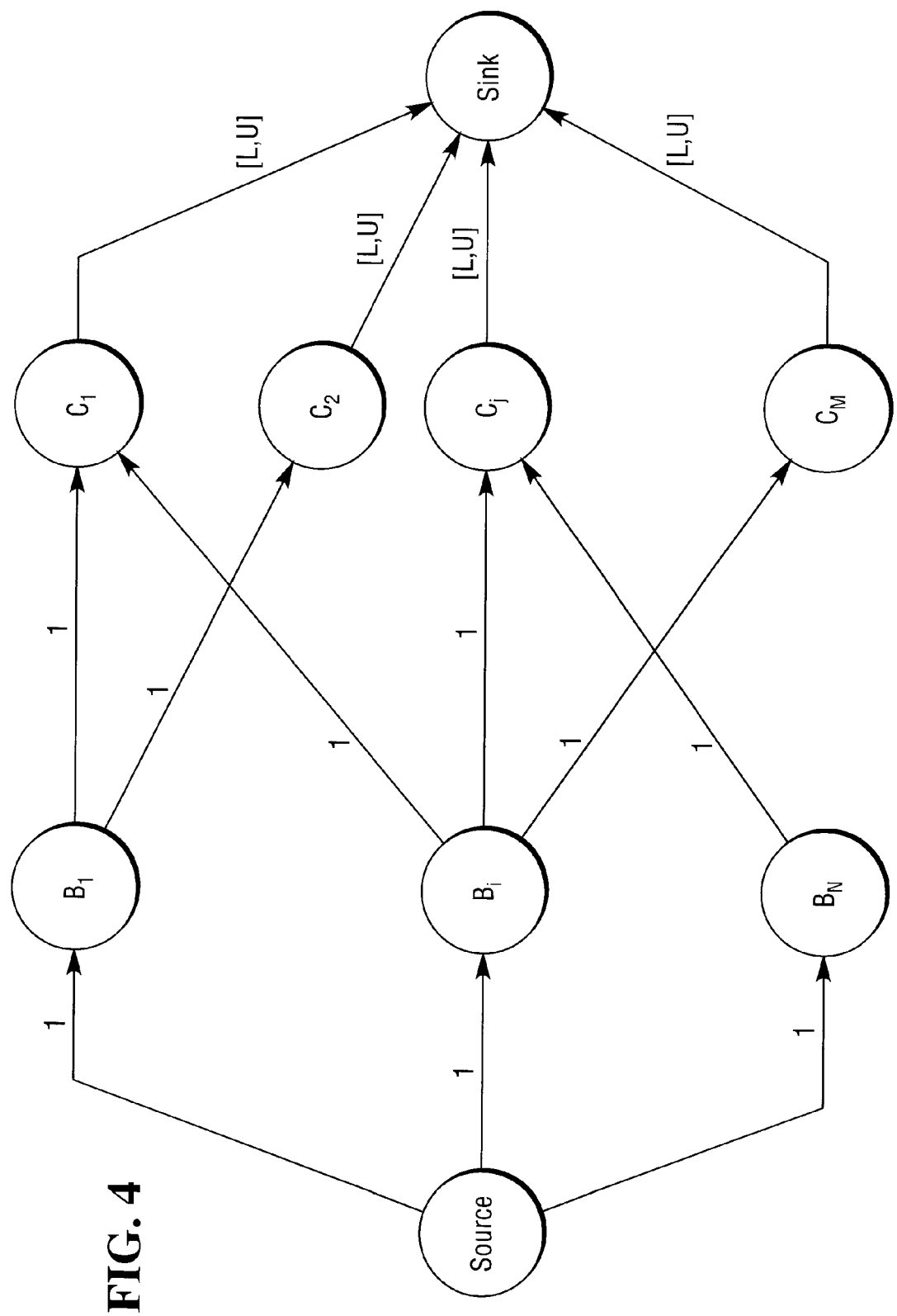
FIG. 4 is a schematic diagram of a flow network that represents a maximum flow network problem that is solved to assign blocks of a file of a distributed file system to computer nodes on which the parallel database management system is implemented.

The assignment problem is how to assign N blocks of the DFS file Z to M computer nodes as evenly as possible. In accordance with some embodiments, the above assignment problem is translated to the maximum flow network problem shown in FIG. 4. The flow network of FIG. 4 is represented as a graph that has a source node and a sink node (where flow is from the source node to the sink node through intermediate nodes.

Assume there are N blocks in the file Z and there are M computer nodes in the system. In the graph representing the flow network, the intermediate nodes between the source node and the sink node includes a first set of graph nodes representing blocks $B_1, \ldots, B_N$ of the file Z, and a second set of graph nodes representing computer nodes $C_1, \ldots C_M$. Each graph node representing a respective block $B_i$ (i=1 to N) is connected to the source node. The capacity of the edge from the source node to each B, graph node is 1.

The $C_j$ (j=1 to M) graph node representing each respective computer node $C_j$ is connected to the sink node, and the capacity of the edge connecting each $C_j$ graph node to the sink node is [LB,UB], where LB=⌊N/M⌋ is the lower capacity bound of the edge and UB=⌈N/M⌉ is the upper capacity bound of the edge.

A graph node $B_i$ is connected by an edge, whose capacity is 1, to a graph node which is in the list $L_i$. Note that there are N+M+2 graph nodes and N+M+N·F edges in the graph. If there exists a maximum flow of N on the graph, then there is a perfect assignment in the sense that the difference of the number of blocks assigned to any two computer nodes is at most 1. This is true because U−L≦1. When there is no perfect solution, the problem can be relaxed by dropping the lower or upper capacity bound on the edges connected to the sink node, and a maximum flow network algorithm can be run to find a near perfect (or approximate) solution.

After a maximum flow is obtained, the assignment from blocks to computer nodes is simply determined as follows. Each edge from block node $B_i$ to a computer node in the maximum flow means that only the copy of block $B_i$ on the $C_j$ computer node should be loaded to the $C_j$ computer node.

In some embodiments, the following heuristic algorithm can be used. For each block $B_i$ and the list $L_i$ of computer nodes (sorted by node identifier) that contains a copy of $B_i$, the copy of block $B_i$ on the $C_j$ computer node is assigned to the $j^{th}$ computer node in L, where j=i mod F.

If it is desired to load multiple DFS files in a batch to the parallel database management system, the above assignment is modified as follows for overall load balancing. The copy of block B, of the k-th file on the $C_j$ computer node is assigned to the $j^{th}$ computer node in L, where j=(i+k) mod F.

After an assignment (mapping) of blocks to computer nodes is obtained, the blocks are assigned to the processing units 114 on each computer node 110 using a processing unit selection algorithm, such as a round-robin selection algorithm. Then a load utility can be used to load the data blocks of file Z from the DFS 108 directly to the processing units 114 on the same computer nodes where the blocks reside. With this approach, no data is sent across computer nodes.

The blocks of the file Z that are sent to the processing units 114 allow the processing units to obtain results of a received query based on data in relational table(s) stored in the parallel database management system 106, as well as based on the blocks of the file Z.

Instructions of software described above (including the parsing engine(s) 112, processing units 114, and software components of the DFS 108 of FIG. 1) are loaded for execution on processors (such as processors in FIG. 1). The processors include microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a storage system, comprising:
   providing a distributed file system across a plurality of computer nodes of the storage system, wherein the distributed file system has at least one file;
   providing a parallel database management system on the plurality of computer nodes of the storage system, the parallel database management system including at least one relational table that is separate from the at least one file;
   in response to a query that causes access of the file and access of the relational table, determining, by one or more processors, a mapping of blocks of the file to the computer nodes using an algorithm that avoids or reduces sending of blocks of the file across the computer nodes;
   using, by the one or more processors, the mapping to assign the blocks of the file to corresponding processing units of the parallel database management system;
   loading the blocks to the processing units according to the assigning; and
   using, by the processing units, the loaded blocks and data accessed from the relational table to produce a result for the query.

2. The method of claim 1, further comprising receiving the query by the parallel database management system, wherein the query is for accessing data of the parallel database management system.

3. The method of claim 1, wherein using the mapping to assign the blocks of the file to the corresponding processing units comprises:
   within each given one of the computer nodes,
       assigning the blocks of the file located in the given computer node to the processing units executing in the given computer node.

4. The method of claim 3, wherein assigning the blocks of the file located in the given computer node to the processing units executing in the given computer node is based on a selection algorithm.

5. The method of claim 4, wherein the selection algorithm is a round-robin selection algorithm.

6. The method of claim 1, wherein the mapping and assigning are performed without inter-communication among the processing units.

7. The method of claim 1, wherein providing the distributed file system comprises storing replicas of the blocks of the file, wherein a replica of a given block of the file is stored on a different computer node than the given block.

8. The method of claim 7, wherein determining the mapping comprises determining the mapping that includes mapping the replicas of the blocks to corresponding computer nodes.

9. The method of claim 1, wherein determining the mapping comprises solving a maximum flow network problem including a graph having graph nodes that represent the blocks of the file and the computer nodes.

10. The method of claim 9, wherein the graph further includes a source node and a sink node, wherein the source node is connected to a first set of the graph nodes representing the blocks, and the sink node is connected to a second set of the graph nodes representing the computer nodes, and wherein the first set of graph nodes is connected by edges to the second set of graph nodes.

11. The method of claim 10, wherein solving the maximum flow network problem comprises finding a maximum flow or finding an approximate of the maximum flow.

12. The method of claim 9, further comprising:
    maintaining a list of computer nodes for each corresponding one of the blocks, wherein the list of computer nodes for each corresponding block identifies one or more computer nodes containing the corresponding block.

13. A storage system comprising:
    a distributed file system;
    a parallel database management system;
    a plurality of computer nodes configured to implement the distributed file system and the parallel database management system, wherein the distributed file system is configured to store files, and wherein the parallel database management system is configured to store relational tables that are separate from the files,
    wherein the parallel database management system includes processing units distributed across the computer nodes such that each of the computer nodes includes at least one of the processing units,
    wherein in response to a query received by the parallel database management system that causes access of at least one file of the distributed file system and at least one relational table of the parallel database management system, the parallel database management system is configured to:
       determine a mapping between blocks of the at least one file and corresponding computer nodes using an algorithm that avoids or reduces sending of blocks of the at least one file across the computer nodes;
       use the mapping to assign the blocks of the at least one file to the corresponding processing units;
       according to the assigning, load the blocks of the at least one file to the processing units; and
       use, by the processing units, the loaded blocks and data accessed from the at least one relational table to produce a result for the query.

14. The storage system of claim 13, wherein loading of the blocks to the processing units comprises locally loading respective blocks in each of the computer nodes to respective processing units in each of the computer nodes, such that communication of blocks across a network that connects the computer nodes is avoided in loading the blocks to the processing units.

15. The storage system of claim 14, wherein assigning the blocks of the at least one file to the processing units in each of the computer nodes is based on a selection algorithm.

16. The storage system of claim 13, wherein the mapping between blocks of the at least one file and corresponding computer nodes is based on solving a maximum flow network problem that involves identifying a maximum flow in a flow network that contains graph nodes representing the blocks and graph nodes representing the computer nodes.

17. An article comprising at least one storage medium storing instructions that upon execution by one or more processors cause a storage system to:

receive a query at a parallel database management system implemented across a plurality of computer nodes of the storage system, wherein the query causes access of a file of a distributed file system that is implemented across the plurality of computer nodes, the parallel database management system including at least one relational table that is separate from the file;

in response to the query, determine a mapping of blocks of the file to the computer nodes using an algorithm that avoids or reduces sending of blocks of the file across the computer nodes, wherein determining the mapping is based on solving a maximum flow network problem that identifies a maximum flow or an approximate maximum flow in a flow network having graph nodes representing the blocks of the file and the computer nodes;

use the mapping to assign the blocks of the file to corresponding processing units of the parallel database management system;

load the blocks to the processing units according to the assigning; and use, by the processing units, the loaded blocks and data accessed from the relational table to produce a result for the query.

18. The method of claim 1, wherein the file includes website data.

19. The method of claim 18, wherein the website data includes click data corresponding to user selections of links at a website.

20. The method of claim 19, wherein using the loaded blocks and the data accessed from the relational table to produce the result for the query comprises using the loaded blocks containing portions of the click data.

21. The storage system of claim 13, wherein at least one of the files contains click data corresponding to user selections of links at a website, and wherein the parallel database management system is configured to use the loaded blocks containing portions of the click data to produce the result for the query.

* * * * *